(12) United States Patent
Spencer et al.

(10) Patent No.: US 7,103,340 B2
(45) Date of Patent: Sep. 5, 2006

(54) ANTENNA DIVERSITY ARRANGEMENT

(75) Inventors: Adrian G. Spencer, Horley (GB);
Kevin R. Boyle, Horsham (GB);
Christopher B. Marshall, Haywards Heath (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 413 days.

(21) Appl. No.: 10/153,256

(22) Filed: May 22, 2002

(65) Prior Publication Data
US 2002/0183087 A1 Dec. 5, 2002

(30) Foreign Application Priority Data
Jun. 1, 2001 (GB) ................... 0113271.1

(51) Int. Cl.
H04B 1/06 (2006.01)
H04B 7/00 (2006.01)
H04B 1/02 (2006.01)
H04M 1/00 (2006.01)

(52) U.S. Cl. ............ 455/272; 455/277.1; 455/277.2; 455/101; 455/575.7

(58) Field of Classification Search ............. 455/272, 455/277.1, 277.2, 101, 13.3, 69, 575.7
See application file for complete search history.

(56) References Cited

U.S. PATENT DOCUMENTS 5,970,396 A * 10/1999 Takashima ............ 455/135
6,067,449 A * 5/2000 Jager ................. 455/277.2
6,141,392 A * 10/2000 Hoshikuki et al. ...... 375/347
6,330,433 B1 * 12/2001 Jager ................. 455/277.2
6,360,089 B1 * 3/2002 Saitoh ................ 340/7.1
6,415,141 B1 * 7/2002 Kakura et al. ......... 455/277.1

FOREIGN PATENT DOCUMENTS

DE 1995754 A 6/2001

OTHER PUBLICATIONS

Theodore S. Rappaport, Wireless Communications Principles & Practice 1996, Prentice Hall.*
Patent Abstracts of Japan; vol. 1999, No. 09, Jul. 30, 1999, JP11122153A.

* cited by examiner

Primary Examiner—George Eng
Assistant Examiner—Un C. Cho
(74) Attorney, Agent, or Firm—Larry Liberchuk

(57) ABSTRACT

An antenna diversity arrangement is applicable to frequency hopping receiver (34) for receiving data packets transmitted on frequency channels lying within an overall frequency bandwidth, divided into a plurality of sub-bands. In each sub-band the frequency characteristics of the channel will be substantially the same. The choice of antenna (10, 12) for a particular sub-band is done by carrying-out frequency diversity measurements and the selection is treated as being valid for a period of time which may be preset or determined dynamically. In operation the hopping sequence is known to the receiver so that it can determine in advance the frequency of the next data packet to be received and can select the particular antenna without the necessity of carrying out diversity measurements. At the end of the time period the suitability of the selected antenna is checked and if necessary the selection is updated in the receiver.

9 Claims, 5 Drawing Sheets

|  | Velocity m/s | | | |
|---|---|---|---|---|
|  | 0.5 | 1.0 | 1.5 | 2.0 |
| 0.6250 | 0.9999 | 0.9995 | 0.9988 | 0.9979 |
| 1.2500 | 0.9995 | 0.9979 | 0.9952 | 0.9915 |
| 1.8750 | 0.9988 | 0.9952 | 0.9892 | 0.9809 |
| 2.5000 | 0.9979 | 0.9915 | 0.9809 | 0.9662 |
| 3.1250 | 0.9967 | 0.9867 | 0.9702 | 0.9475 |
| 3.7500 | 0.9952 | 0.9809 | 0.9573 | 0.9251 |
| 4.3750 | 0.9935 | 0.9740 | 0.9423 | 0.8991 |
| 5.0000 | 0.9915 | 0.9662 | 0.9251 | 0.8698 |
| 5.6250 | 0.9892 | 0.9573 | 0.9059 | 0.8374 |
| 6.2500 | 0.9867 | 0.9475 | 0.8848 | 0.8024 |
| 6.8750 | 0.9839 | 0.9368 | 0.8620 | 0.7648 |
| 7.5000 | 0.9809 | 0.9251 | 0.8374 | 0.7253 |
| 8.1250 | 0.9776 | 0.9125 | 0.8114 | 0.6840 |
| 8.7500 | 0.9740 | 0.8991 | 0.7839 | 0.6414 |
| 9.3750 | 0.9702 | 0.8848 | 0.7551 | 0.5978 |
| 10.0000 | 0.9662 | 0.8698 | 0.7253 | 0.5536 |
| 10.6250 | 0.9619 | 0.8540 | 0.6945 | 0.5093 |
| 11.2500 | 0.9573 | 0.8374 | 0.6628 | 0.4651 |
| 11.8750 | 0.9525 | 0.8202 | 0.6306 | 0.4215 |
| 12.5000 | 0.9475 | 0.8024 | 0.5978 | 0.3787 |

Time / msec

FIG. 8

ANTENNA DIVERSITY ARRANGEMENT

The present invention relates to an antenna diversity arrangement having particular, but not exclusive, application to frequency hopping packet data systems, such as Bluetooth, Trade Mark (™), in which the hopping rate is fast but the channel characteristics vary relatively slowly.

Figure 1:
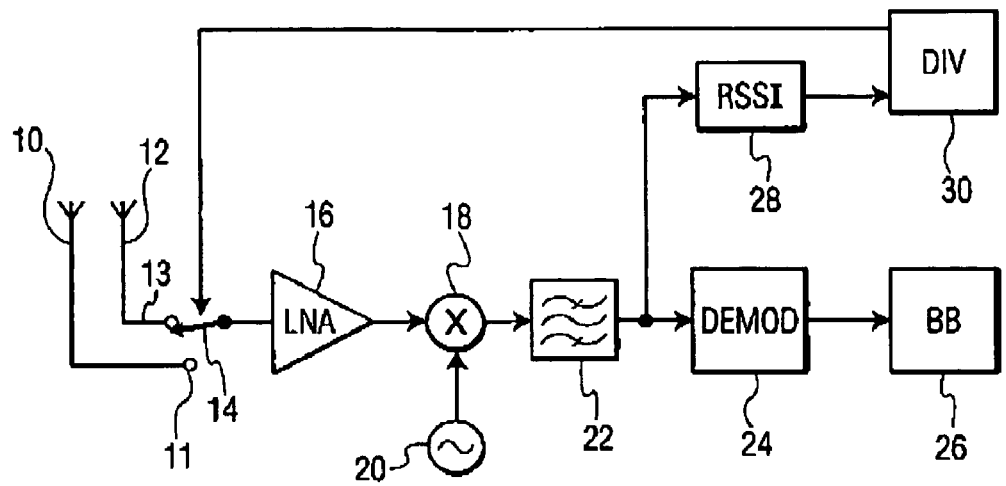
Figure 2:
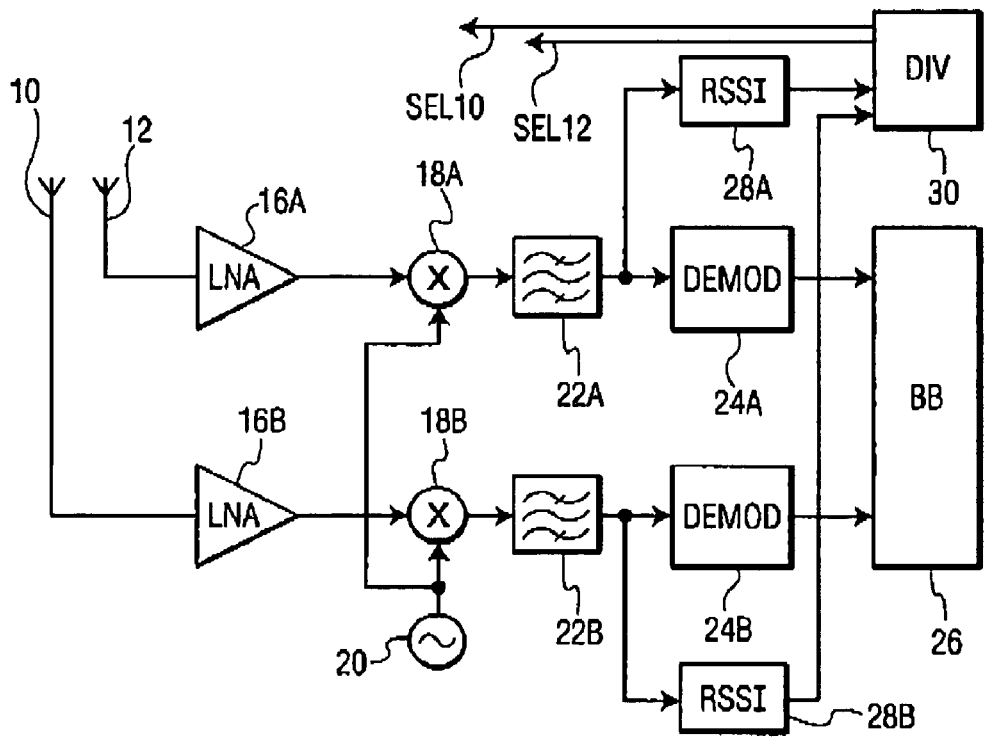

Antenna diversity systems are well known and two examples of typical receiver architectures are shown in block schematic form in FIGS. 1 and 2 of the accompanying drawings. Referring to FIG. 1, antennas 10, 12 are connected to respective poles 11, 13 of a changeover switch 14. A moveable contact of the switch is coupled by way of a low noise amplifier 16 to one input of a mixer 18. A second input of the mixer 18 is coupled to a local oscillator 20. The products of mixing are applied to a channel filter 22 which selects the signals to be demodulated in a demodulator 24. The demodulated output is applied to a baseband processing stage (BB) 26. In order to effect antenna diversity a received signal strength indicator (RSSI) stage 28 has an input coupled to the output of the channel filter 22 and an output coupled to a diversity control stage (DIV) 30. The stage 30 provides control signals for actuating the moveable contact of the switch 14 to select one or other of the antennas 10, 12. In the operation of one type of antenna diversity arrangement, frequently termed switched diversity, one of the antennas remains selected until the received signal strength falls below some limit of acceptability. At this point the diversity control stage 30 switches between the antennas 10, 12 to determine which is the better and selects that one. If the received signal strength remains poor the selection process may be repeated frequently. A feature of using this type of architecture with frequency hopping data packet signals is that the switching from one antenna to another does not occur until after the data packet has been received by which time the channel characteristics may have changed prior to the receipt of the next data packet in which case the diversity decision may be invalid.

FIG. 2 shows an alternative diversity arrangement which is frequently termed selection diversity. Comparing FIGS. 1 and 2 it will be noted that the architecture in FIG. 2 comprises two receivers of the type shown in FIG. 1, each one being coupled to a respective one of the antennas 10, 12. For convenience of reference the same reference numerals have been used with the suffix A or B added. As the basic amplification, down mixing and filtering operations of the receivers is the same as described with reference to FIG. 1, in the interests of brevity it will not be repeated. The switch 14 has been omitted and the diversity control stage 30 has output control paths SEL 10 and SEL 12 for selecting one or other of the signal paths from the antennas 10, 12, respectively. During the signal strength measurement phase both the receivers are powered but one of them is switched-off once the better signal path has been selected. This architecture may also be used for equal gain combining diversity and maximal ratio combining diversity. In the case of frequency hopping data packet systems a diversity decision has to be made on each data packet which requires the repeated energisation of both the receivers. In a system such as Bluetooth™ where typically 800 data packets per second are received, the power consumption is relatively high which is undesirable.

U.S. Patent Specification 6,032,033 discloses a variant of the selection diversity arrangement shown in FIG. 2 which makes use of an architecture of the general type shown in FIG. 1 having a single receiver and switchable antennas. This variant is suitable for use with TDMA systems, such as DECT (Digitally Enhanced Cordless Telephone) or PWT (Personal Wireless Telephone) applications. In the system described a digitised version of a received signal is buffered long enough to allow selection diversity measurements to be made without corrupting the demodulation of the desired signal. While the received signal is buffered, the single receiver makes a performance measurement on each of the two antennas in sequence during the beginning of a data burst, the beginning of the data burst being determined by a timing signal fed back from a previous burst. The previously unused antenna is measured first to minimize the likelihood of having to do two antenna switches. This cited method still requires measurements to be made on successive data bursts which consumes power.

It is an object of the present invention to reduce the power consumption in operating an antenna diversity arrangement.

According to a first aspect of the present invention there is provided an antenna diversity method for use in a frequency hopping, data packet system operating over a predetermined bandwidth, comprising determining and storing a plurality of frequency sub-bands lying substantially within said predetermined bandwidth, in which a transmitted data packet will be received acceptably, determining which of at least 2 antennas is suitable for use in which frequency sub-band, determining the frequency hopping sequence of a currently received signal, and using knowledge of the sequence of frequencies in the frequency hopping sequence and the sub-band in which the next frequency lies to determine which one of the at least 2 antennas is to receive the data packet.

According to a second aspect of the present invention there is provided a frequency hopping receiver for receiving data packets transmitted on frequency channels lying within an overall frequency bandwidth, comprising first and second antennas, receiving means coupled to the first and second antennas, means for determining and storing a plurality of frequency sub-bands lying substantially within said predetermined bandwidth in which a transmitted data packet will be received acceptably, determining which of the first and second antennas is suitable for use in which frequency sub-band, means for determining and storing the frequency hopping sequence of a currently received signal, and means for using knowledge of the sequence of frequencies in the frequency hopping sequence and the sub-band in which the next frequency lies to determine which one of the first and second antennas is to receive the data packet.

The present invention is based on recognition of the fact that the characteristics of a signal channel will be similar over a frequency range equal to what is termed the "coherence bandwidth" which is approximately equal to $1/(4\times \text{delay spread})$. The delay spread of a channel is defined as the length of time which elapses between the first received transmission ray and the last. For Bluetooth™ the indoor delay spread is of the order of 10 ns. Thus by determining which of two antennas is the more effective for frequencies in a particular coherence bandwidth and knowing in advance the hopping frequency of the next data packet, a diversity decision can be made without the necessity of measuring the characteristics of each channel on receipt of successive data packets. Thus an increased reliability of transmission is obtained together with a saving in receiver power current.

Changing channel dynamics may have an affect on the validity of the diversity decision. Accordingly the quality/strength of a signal received on each antenna is checked periodically based on an elapsed time period, which may be determined mathematically or empirically, or on determining a deterioration of the quality/strength of the received signal. The quality/strength may be expressed not only as RSSI but also as bit error rate (BER) or signal to noise ratio (SNR).

Figure 3:
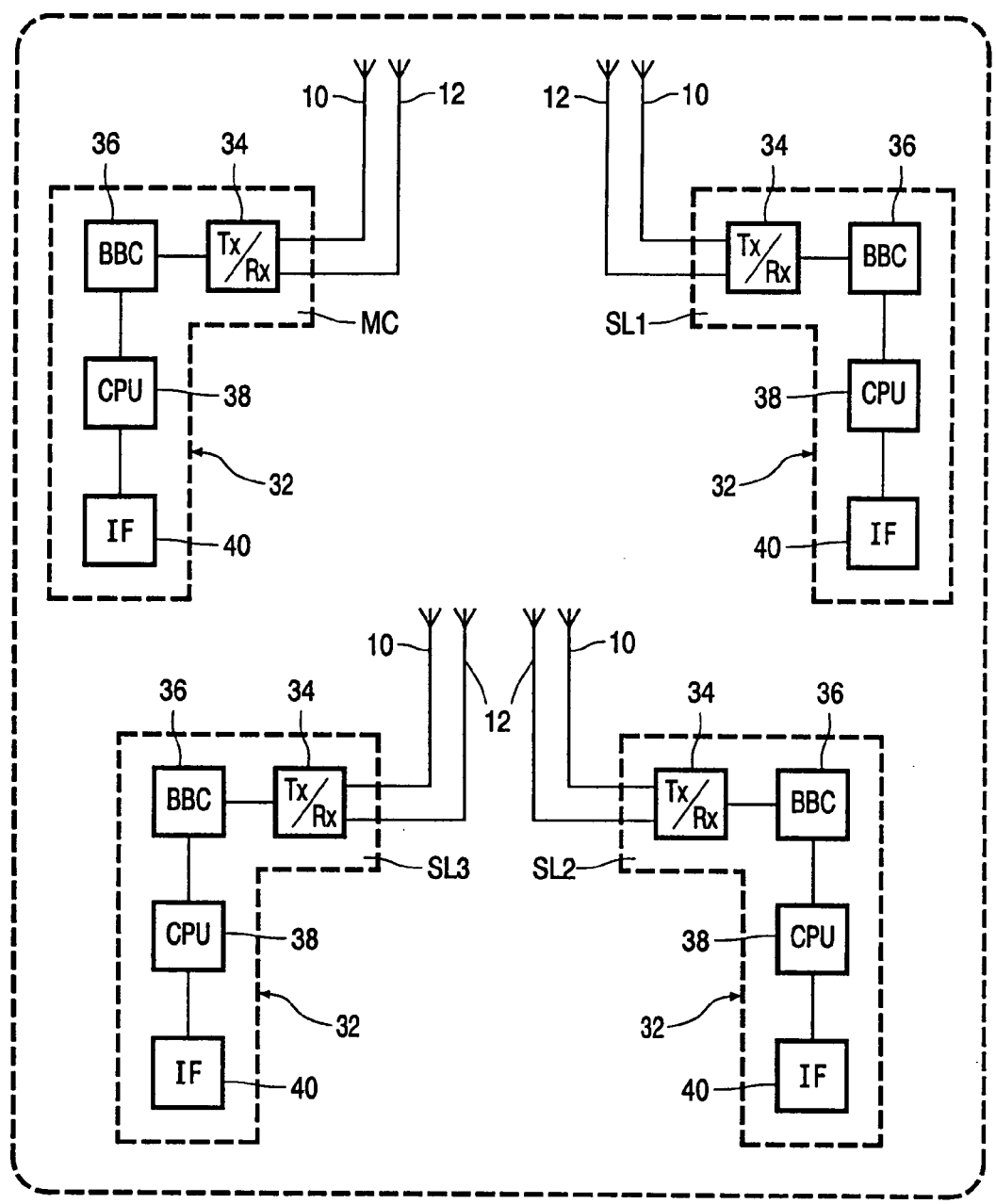
Figure 4:
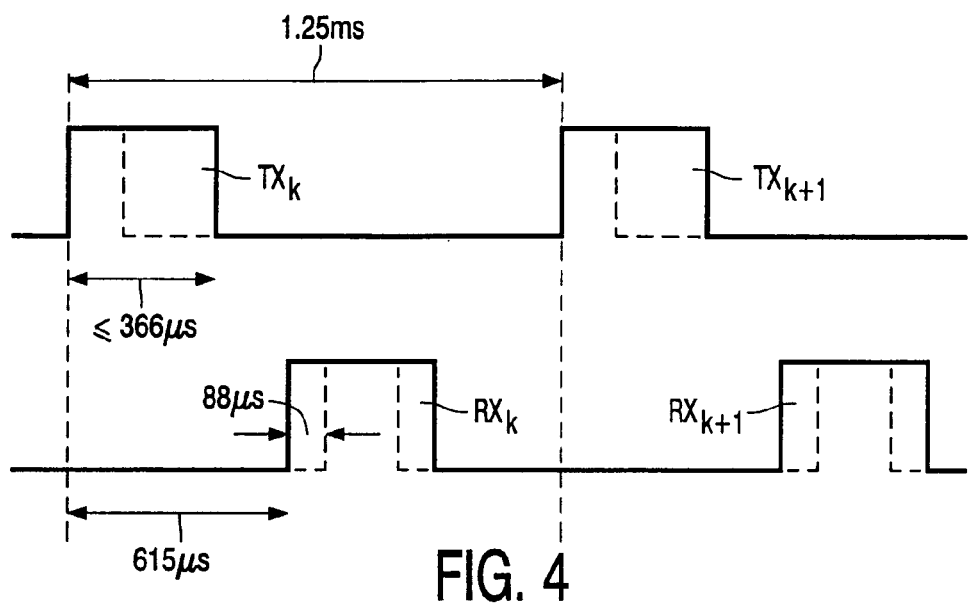
Figure 5:
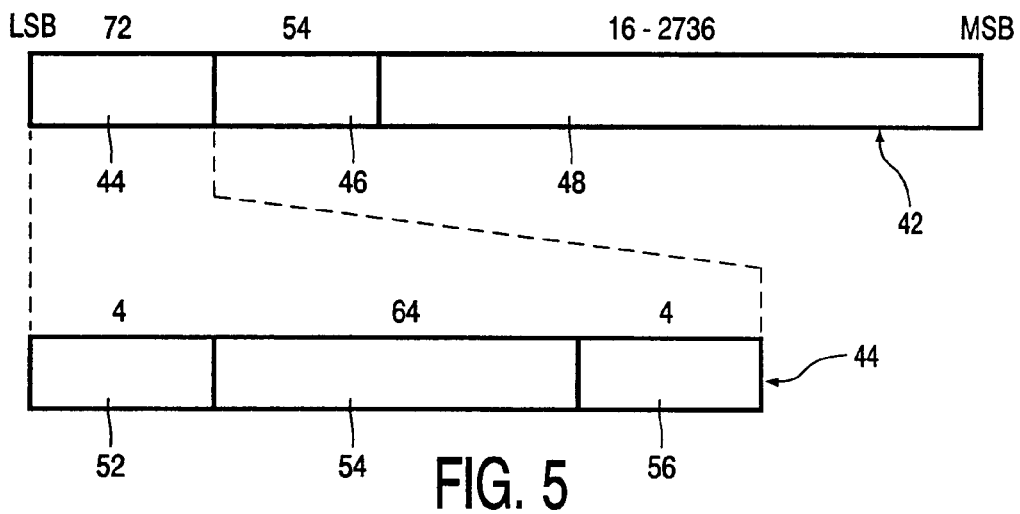
Figure 6:
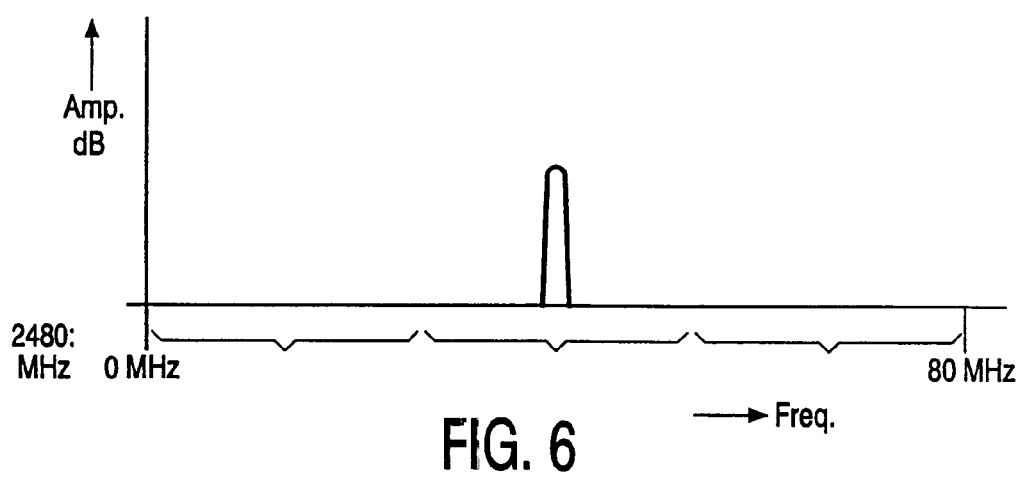
Figure 7:
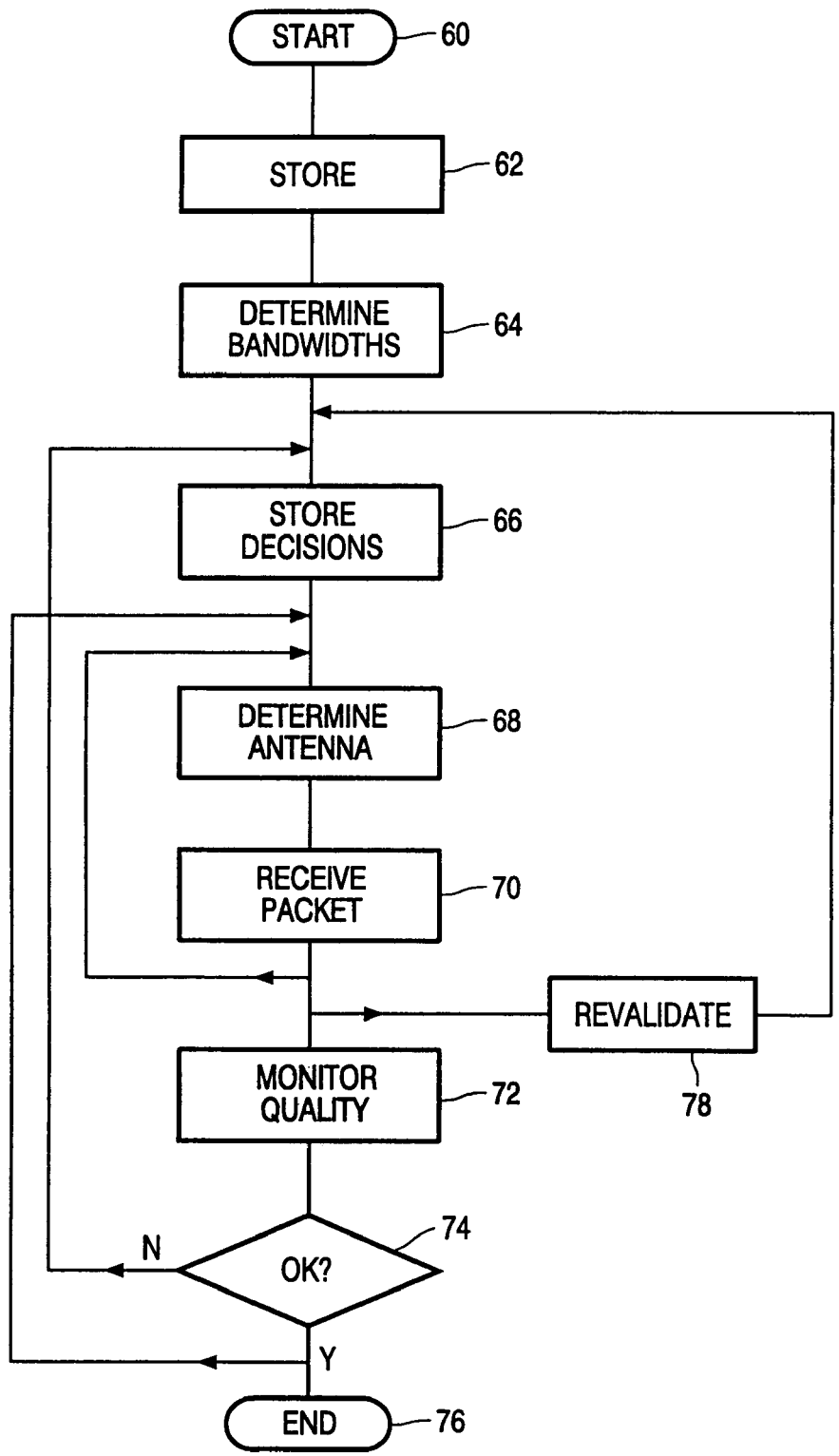

The present invention will now be described, by way of example, with reference to the accompanying drawings, wherein:

FIG. 1 is a block schematic diagram of a known receiver architecture having a switched antenna diversity arrangement, FIG. 2 is a block schematic diagram of a known receiver architecture having a selection diversity arrangement, FIG. 3 is a block schematic diagram of a Bluetooth™ point-to-multipoint, frequency hopped, data packet piconet system, FIG. 4 is a diagram illustrating the transmitter/receiver cycle of a Bluetooth™ transceiver in normal mode for single slot packets, FIG. 5 is an illustration of a Bluetooth™ standard packet definition showing the channel access code field expanded, FIG. 6 is a diagam illustrating the Bluetooth™ band, FIG. 7 is a flow chart illustrating the operation of the method in accordance with the invention, and FIG. 8 is a table showing envelope correlation coefficients with respect to a Bluetooth™ hop time of 625 μs (viz. 1600 hops per second).

In the drawings the same reference numerals have been used to indicate corresponding features.

The Bluetooth™ piconet system shown in FIG. 3 comprises a plurality of wireless stations 32 with associated user apparatus (not shown), such as mobile phones, laptop computers, personal computers and a printer. One of the wireless stations functions as a master controller MC and the remaining stations SL1, SL2 and SL3 function as slave stations. The stations communicate with each other over time division duplex (TDD) links.

Each of the wireless stations 32 is substantially identical and comprises a frequency hopped transceiver 34 having selection diversity. At least the receiver section has an architecture similar to that shown in FIG. 2 and accordingly in the interests of brevity will not be described. However it is to be understood that the method in accordance with the present invention may be used with other receiver architectures such as those described in the preamble of this specification. The transceiver 34 is coupled to a link baseband controller (BBC) 36 which is coupled to a central processing unit (CPU) core 38 which in turn is coupled to external interfaces (IF) 40.

In many implementations of the link baseband controller 36 it comprises hardware for performing baseband processing and basic protocols and hardware to interface a Bluetooth™ unit to the Bluetooth ™ radio environment. Commands, responses and data are transferred between Bluetooth™ units across the radio interface in packets.

Each of the slave units SL1 to SL3 has a similar architecture and in the interests of brevity will not be described.

The system shown in FIG. 3 is operated in accordance with the Bluetooth™ standard, details of which can be readily obtained by way of the internet. However in order to facilitate the understanding of the present invention a brief summary will be given. Bluetooth™ is specifically designed to provide low cost, robust, high capacity ad-hoc voice and data networking in the 2.4 GHz ISM band. Robustness is provided by using a packet-based switching protocol based on a frequency hop scheme with 1600 hops/s. The entire available frequency spectrum is used in the case of Europe, except Spain and France, and the U.S.A., and there are 79 channels spaced 1 MHz apart. A channel is divided into time slots of 625 μs in length. In the time slots, the master and slave units can transmit packets. The packet can be aligned with the slot start. In the case of a single time slot transmission a time division duplex (TDD) scheme is used where the master and slave transmit alternately. Referring to FIG. 4, the master unit starts its transmission in even numbered time slots and the slave unit starts its transmission in odd-numbered time slots only. The TDD frame length is 1.25 ms.

FIG. 5 illustrates the format of a packet 42 which consists of three fields, namely a 72 bit access code 44 which is used for synchronization, DC offset compensation and identification, a 54 bit header 46 and payload 48 comprising between 16 and 2736 bits. More specifically the access code 44 comprises a 4 bit preamble 48 consisting of zero-one pattern, a 64 bit sync code word 54 and a 4 bit trailer 56 comprising a zero-one pattern.

Referring to FIG. 6, the Bluetooth m band extends over a bandwidth of 80 MHz beginning at 2480 MHz and each Bluetooth™ channel 58 has a bandwidth of 1 MHz. The overall bandwidth of 80 MHz is shown to comprise coherence bandwidths CB1, CB2 and CB3. A coherence bandwidth is derived from the delay spread which in a multipath environment, such as an office, is the length of time which elapses between the first received transmission ray and the last. For Bluetooth™ in an indoor environment this time elapse is of the order of 10 ns. The coherence bandwidth is approximately equal to 1/(4×delay spread) that is 25 MHz. The bandwidth of a fade is roughly equal to the coherence bandwidth. Given that the characteristics of the channel will be similar over a frequency range equal to the coherence bandwidth, the method in accordance with the present invention makes use of the knowledge of which antenna was used, at which frequencies, and at which times, to enable future packets of data to be received without having to make a diversity measurement. This will save power in the receiver and increase the quality of transmission thereby have less errors. The store of data will only be valid for a period of time dependent on the hopping sequence and the dynamics of the channel and will be updated frequently. This will require extra processing in the baseband of the receiver to hold the table of frequencies, diversity decision made, time at which the decision was made and how long it is valid for. As the frequency hop selection for Bluetooth™ is random, there is an approximate 1 in 3 probability of a future frequency hop being within the coherence bandwidth of the present frequency.

Applying antenna diversity to Bluetooth™ is especially useful for synchronous connection oriented (SCO) links which have no forward error correction or repeat packet request from the receiving device. This type of link is used for audio and video data streams which are time critical. The flow chart shown in FIG. 7 summarises the operations involved in an implementation of the method in accordance with the present invention. Block 60 relates to the start of the flow chart by a Bluetooth™ unit indicating that it wants to establish a radio link with another Bluetooth™ unit. The initiating unit in the block 62 negotiates for a hopping sequence which is stored in the unit. In block 64 the coherence bandwidths for the hopping sequence are determined. Block 66 relates to the unit making and storing diversity decisions based on the coherence bandwidths. Block 68 relates to the unit determining which of the antennas is to be used to receive the next data packet. Block 70 relates to the unit receiving the next data packet.

Block 72 relates to the signal quality being monitored in order to determine whether the stored diversity decisions are still valid and block 74 relates to checking if the quality is acceptable. If the answer is negative (N) the flow chart reverts to the block 66 and a new set of diversity measurements are made. If the answer is in the anfirmative (Y) the flow chart reverts to the block 68 if the transaction is ongoing or alternatively to the block 76 which denotes the end of the transaction.

As an alternative to monitoring the signal quality in the block 72, the flow goes to a block 78 after the block 70. The block 78 relates to the operation of revalidating the diversity decisions after the expiry of a predetermined time interval. The time interval is related to what is termed the "envelope correlation coefficient" of a signal. The envelope correlation coefficient ($P_e(\Delta t)$) of a signal with respect to velocity (V) and time ($\Delta t$) is given by $$p_e(\Delta t) = J_o^2(k.V.\Delta t)$$

where k is the wave number $$\left(\frac{2\pi}{\lambda}\right)$$

in mm$^{-1}$

V is velocity in m/s $\Delta t$ is the time difference.

A correlation coefficient of 1 applies to a static channel, which may be a room in which, and around which, nothing is moving thus forming a static environment.

FIG. 8 shows a table of envelope correlation coefficients with respect to a Bluetooth™ hop time of 625 μs (1600 hops per second) at 2.4 GHz in the frequency band used by Bluetooth™. The left hand column represents multiples of the hop time of 625 μs and the top row represents velocities of 0.5, 1.0, 1.5 and 2.0 in m/s.

Practical results have been obtained for DECT in which the packet length is much longer, namely 5 ms. With switched diversity, the results show that for a maximum diversity gain of 10dB, this gain is decreased by 8 dB for 10 ms elapsed time with the relative velocity of the transmitter and receiver being 1 metre/second. However with selection diversity and a 5 ms elapsed time (the switching decision can be made one packet earlier), the diversity gain is decreased by 2 dB at 1 metre/second. These two results have been shown in bold in FIG. 8. The indication is that the envelope correlation coefficient should be of the order 0.95 or higher to minimise the loss of diversity gain in a dynamic channel. Equating this to Bluetooth™ packets, for a 2dB loss in diversity gain, a diversity application would be valid for a current packet and the following 7 packets. This is an estimate of what is achievable. In practice, either this approximation could be used, or a more sophisticated system, based on measuring the BER of following packets, to determine how long the diversity decision is valid for. This would minimise the power consumption of the receiver.

As Bluetooth™ is an alternate transmit-receive system and channel characteristics are equal in both directions between two given points, the method in accordance with the present invention could be used for the case when the direction of transmission is reversed (nominally every other packet).

Although the present invention has been described with reference to Bluetooth™ it is to be understood that the method could be used in any frequency hopping protocol in which diversity is used to improve the reliability of the data link. In order for the diversity measurement to remain valid for a useful time period, the packet rate must be fast compared to the changing characteristics of the channel.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the design, manufacture and use of diversity receivers and component parts therefor and which may be used instead of or in addition to features already described herein.

The invention claimed is:

1. An antenna diversity method for use in a frequency hopping, data packet system operating over a predetermined bandwidth, the method comprising the steps of:
   determining and storing measurements on a selected number of a plurality of frequency sub-bands lying substantially within said predetermined bandwidth, in which a transmitted data packet will be received acceptably, wherein said frequency sub-bands are substantially equal to 1/(4*delay spread);
   determining which of at least two antennas is suitable for use in each of the frequency sub-bands;
   determining the frequency hopping sequence of a currently received signal; and
   using knowledge of the frequency hopping sequence and the sub-band in which the next frequency lies to determine which one of the at least two antennas is to receive the data packet.

2. A method as claimed in claim 1, further comprising the step of monitoring a characteristic of a received data packet and in response to detecting a deterioration in the characteristic, re-assessing which of the at least two antennas is suitable for use in which frequency sub-band.

3. A method as claimed in claim 1, further comprising the step of periodically re-assessing which of the at least two antennas is suitable for use in which frequency sub-band.

4. A method as claimed in claim 1, further comprising the step of effecting antenna diversity by selection diversity.

5. A frequency hopping receiver for receiving data packets transmitted on frequency channels lying within an overall frequency bandwidth, comprising:
   first and second antennas;
   a receiver coupled to the first and second antennas; and
   a controller for determining and storing measurements on a selected number of a plurality of frequency sub-bands lying substantially within said predetermined bandwidth in which a transmitted data packet will be received acceptably, wherein said frequency sub-bands are substantially equal to 1/(4*delay spread), determining which of the first and second antennas is suitable for use in each of the frequency sub-bands, determining and storing the frequency hopping sequence of a currently received signal, and using knowledge of the frequency hopping sequence and the sub-band in which the next frequency lies to determine which one of the first and second antennas is to receive the data packet.

6. A receiver as claimed in claim 5, wherein the controller further monitors a characteristic of a received data packet and in response to detecting a deterioration in the characteristic, for re-assessing which of the first and second antennas is suitable for use in which frequency sub-band.

7. A receiver as claimed in claim 6, wherein the controller further periodically re-assesses which of the first and second antennas is suitable far use in which frequency sub-band.

8. A receiver as claimed in claim 5, wherein the controller further effects antenna diversity by selection diversity.

9. A receiver as claimed in claim 5, wherein the controller effects antenna diversity by switching diversity.

* * * * *